US009191913B2

(12) United States Patent (10) Patent No.: US 9,191,913 B2
Arcidiacono et al. (45) Date of Patent: Nov. 17, 2015

(54) METHOD FOR LOCATING A TERMINAL AT THE SURFACE OF A COVERAGE AREA BY MEANS OF A TELECOMMUNICATION NETWORK USING A MULTI-BEAM SATELLITE

(75) Inventors: Antonio Arcidiacono, Paris (FR);
Daniele Vito Finocchiaro, Paris (FR);
Alessandro Le Pera,
Issy-les-Moulineaux (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 14/118,684

(22) PCT Filed: May 23, 2012

(86) PCT No.: PCT/EP2012/059537

§ 371 (c)(1),
(2), (4) Date: Jan. 10, 2014

(87) PCT Pub. No.: WO2012/163744

PCT Pub. Date: Dec. 6, 2012

(65) Prior Publication Data

US 2014/0119409 A1 May 1, 2014

(30) Foreign Application Priority Data

May 27, 2011 (FR) ...................................... 11 54663

(51) Int. Cl.
*H04B 1/00* (2006.01)
*H04W 64/00* (2009.01)
(Continued)

(52) U.S. Cl.
CPC ................. *H04W 64/00* (2013.01); *G01S 1/72* (2013.01); *H04B 1/707* (2013.01); *H04B 7/185* (2013.01); *H04B 7/18547* (2013.01)

(58) Field of Classification Search
CPC ........... H04B 7/18567; H04W 84/022; H04W 84/024; H04W 8/10; H04W 8/16
USPC .............................................. 455/12.1, 404.2
See application file for complete search history.

(56) References Cited

U.S. PATENT DOCUMENTS 6,400,319 B1 6/2002 Castelloe et al.
6,515,617 B1 * 2/2003 Demers et al. ........... 342/357.64
(Continued)

FOREIGN PATENT DOCUMENTS

EP 0 848 506 6/1998
WO WO 2006123064 A1 * 11/2006
WO WO 2009/007513 1/2009

OTHER PUBLICATIONS

International Search Report as issued for International Application No. PCT/EP2012/059537, dated Jul. 6, 2012.
(Continued)

*Primary Examiner* — Chieh M Fan
*Assistant Examiner* — Wednel Cadeau
(74) *Attorney, Agent, or Firm* — Pillsbury Winthrop Shaw Pittman LLP

(57) ABSTRACT

A method for locating a terminal in a coverage area using a telecommunication network, the network including a multi-beam satellite, the area including various cells, each associated with a beam for linking to the satellite to which a frequency band is assigned, the method including: performing the uplink transmission of a message incorporated into a modulated signal to the satellite at a frequency shared by three different uplink beams such that the message is received by the satellite with three different amplitudes; performing the downlink transmission of three modulated signals incorporating the message, the first, second, and third signals each corresponding to a different beam from among the three beams; receiving the first, second, and third signals; determining the amplitudes of the message within the first, second and third signals; and determining the location of the terminal from the amplitudes of the message within the first, second, and third signals.

9 Claims, 4 Drawing Sheets

(51) Int. Cl.
*G01S 1/72* (2006.01)
*H04B 7/185* (2006.01)
*H04B 1/707* (2011.01)

(56) References Cited

U.S. PATENT DOCUMENTS

| | | | |
|---|---|---|---|
| 6,816,705 B1 * | 11/2004 | Quan et al. | 455/12.1 |
| 6,871,061 B1 | 3/2005 | Koorapaty et al. | |
| 7,525,934 B2 * | 4/2009 | Ames et al. | 370/319 |

2010/0054131 A1    3/2010  Del Rio Herrero et al.

OTHER PUBLICATIONS

Patel, P., et al., "Analysis of a Simple Successive Interference Cancellation Scheme in a DS/CDMA System," IEEE Journal on Selected Areas in Communications, vol. 12, No. 5, Jun. 1994, pp. 796-807.

Pedersen, K. I., et al., "Practical Implementation of Successive Interference Cancellation in DS/CDMA Systems," Proceedings of IEEE ICUPC, vol. 1, 1996, pp. 321-325.

* cited by examiner

METHOD FOR LOCATING A TERMINAL AT THE SURFACE OF A COVERAGE AREA BY MEANS OF A TELECOMMUNICATION NETWORK USING A MULTI-BEAM SATELLITE

CROSS REFERENCE TO RELATED APPLICATIONS

This is the U.S. National Stage of PCT/EP2012/059537, filed May 23, 2012, which in turn claims priority to French Patent Application No. 1154663, filed May 27, 2011, the entire contents of all applications are incorporated herein by reference in their entireties.

The present invention relates to a method for locating a terminal at the surface of a coverage area by means of a telecommunication network for establishing radiofrequency links. The geolocation method applies more specifically to a network using a satellite having a plurality of beams, referred to as a multi-beam satellite. This type of satellite enables the use of several beams on board the satellite to cover geographic areas or cells, instead of a single broad beam.

Numerous methods for geolocating terminals at the surface of a given coverage area are known.

The best known of them is the Global Positioning System (GPS), which functions through calculation of the distance that separates a terminal integrating a GPS receiver and several satellites. Such a system nevertheless poses a certain number of difficulties.

Firstly, the system obviously assumes that the terminal integrates a GPS receiver and thus does not cover a generic telecommunication terminal.

Moreover, it is sometimes important to know in a certain manner the position of a terminal with regard to a service centre, rather than on the terminal itself (typically in the case of the geolocation of a fleet of vehicles by a company). In this case, the GPS terminal transmits its position to the company via a telecommunication networks. Such a solution may nevertheless have certain drawbacks in so far as the user of the terminal can falsify the GPS data transmitted (for example via a GPS emulator).

Another known solution consists in using a service of the OmniTRACS™ type. A box installed in the vehicle performs measures on data sent by a "hub" type terrestrial station through several telecommunication satellites then transmits the measures made via a satellite to a terrestrial station or a NOC (Network Operating Centre) type centre which is going to process the measures made and determine the position of the vehicle.

Apart from the non-negligible cost of such a system (linked in particular to the presence of a sophisticated box provided with a steerable antenna), the falsification of the data transmitted may once again be perfectly envisaged, the NOC not being provided with any means to certify the position of the vehicle or terminal.

In general, the methods of limited cost known today for determining, with regard to a service centre, the position of a terminal are based on data measured and then sent by the terminal itself and it is not possible for the service centre to establish the authenticity of said data, and thus the position of the terminal calculated from said data.

In this context, the present invention aims to provide an economical method for locating a terminal at the surface of a coverage area by means of a telecommunication network, the determination of the location taking place in a certain manner (i.e. without possible falsification by the user of the terminal) and while using a telecommunication terminal.

To this end, the invention proposes a method for locating a terminal at the surface of a coverage area by means of a telecommunication network for establishing radiofrequency links, the network comprising a telecommunication satellite having a plurality of beams, referred to as a multi-beam satellite, said multi-beam satellite comprising a multi-beam antenna, said coverage area consisting of a plurality of cells, each cell being associated with at least one beam for linking with the satellite to which a frequency band is assigned, said method comprising the following steps:

the terminal performing the uplink transmission of a message incorporated into a modulated signal to said satellite at a frequency shared by at least three different uplink beams such that said message is received by said multi-beam satellite via said multi-beam antenna with three different amplitudes;

said multi-beam satellite performing the downlink transmission of three modulated signals incorporating said message, the first, second, and third signals each corresponding to a different beam from among said three beams;

terrestrial receiving means receiving said first, second, and third signals;

terrestrial calculation means determining the amplitudes of the message sent by the terminal contained in said first, second and third signals;

determining the location of the terminal from the amplitudes of said message within said first, second, and third signals.

Terminal is taken to mean a terminal which may be fixed, transportable such as a decoder for example, or mobile.

According to the invention, three beams sharing a same uplink frequency are advantageously used; the message transmitted by the terminal is received by the multi-beam antenna of the satellite with three different amplitudes; three signals incorporating said message corresponding to these three amplitudes and having the same payload (body data) are transmitted in downlink to terrestrial receiving means (typically a terrestrial station) which is going to detect the message in each of the three signals and determine therefrom the amplitudes. Knowledge of these amplitudes is going to make it possible to position the terminal on the service area using the link between amplitudes of the message in the signals received and the figures of merit associated with the position of the terminal with respect to each of the cells associated respectively with the three beams.

It will be noted that, thanks to the invention, the determination of the position of the terminal takes place without adaptation of the terminal, which may be a standard telecommunication terminal. Moreover, the terminal does not carry out any specific calculation for the determination of its position.

Moreover, a single telecommunication multi-beam satellite is necessary for the implementation of the method according to the invention; said satellite may be used both for the implementation of the method according to the invention and to assure communications.

It will be noted that the terminal does not intervene in the determination of its position; consequently, the user of the terminal cannot falsify the position of the latter.

The method according to the invention may also have one or more of the characteristics below, considered individually or according to any technically possible combinations thereof:

said signal incorporating said message transmitted by the terminal (and thus said three signals received by the multi-beam antenna) is modulated according to a spread spectrum protocol;

said message incorporated into said first signal is received by said terrestrial receiving means with a greater amplitude than that of said message incorporated into the second and third signals, said method comprising the following steps:

demodulation by said terrestrial calculation means of said first signal so as to recover the following information relative to the message:
the payload of the message;
the emission and/or encoding parameters of said message;
use of said information relative to the message to search for said message respectively in said second and third signals by said terrestrial calculation means (the use of said information makes it possible to speed up this search compared to a standard search in which this same information would not be available);

said signal incorporating said message transmitted by the terminal is modulated according to a spread spectrum protocol and said recovered emission and/or encoding parameters comprise the binary spread spectrum sequence;

said terrestrial calculation means find said message respectively in said second and third signals by a correlation operation;

the downlink transmission by said multi-beam satellite of said three modulated signals incorporating said message takes place at three different frequencies;

the method according to the invention comprises a step of determining at least two of the three amplitude differences of the message incorporated into said first, second and third signals;

the method according to the invention comprises:
a step of determining curves representing the difference in the figures of merit corresponding to said amplitude differences
a step of determining the location of said terminal corresponding to the intersection of said curves;

said terrestrial receiving means periodically receive messages by one or more reference terminals, the exact position of which is known (for example contained in the message itself), said position(s) making it possible to correct the lines of figures of merit used for the determination of the position of said terminal;

the three amplitude differences of the message incorporated into said first, second and third signals is determined;

the information recovered by said terrestrial calculation means in said first signal comprises the preamble of said message.

Other characteristics and advantages of the invention will become clear from the description that is given thereof hereafter, by way of indication and in no way limiting, with reference to the appended figures, among which:

In all the figures, common elements bear the same reference numbers.

Figure 1:
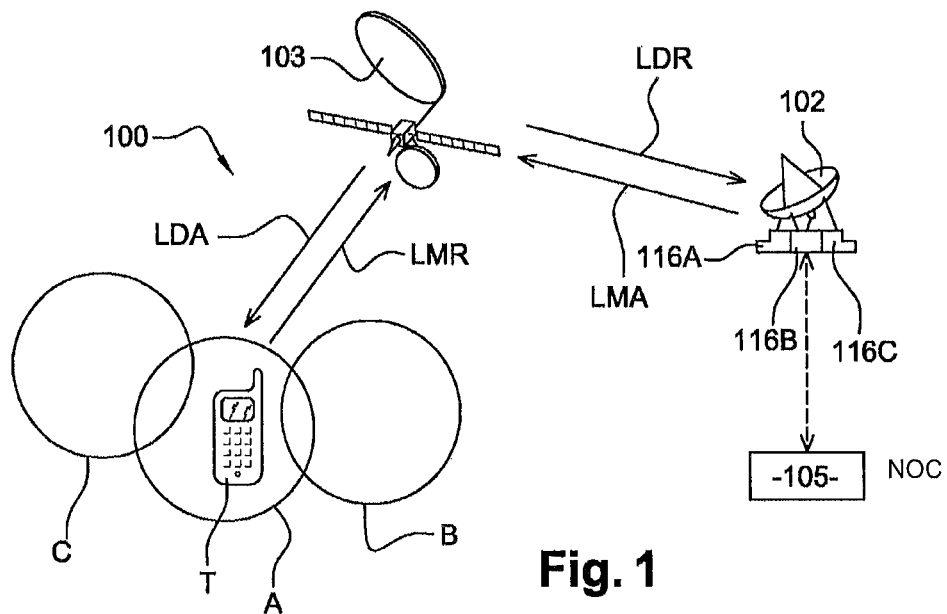
FIG. 1 is a simplified schematic representation of a network with multi-beam configuration for the implementation of the method according to the invention.
Figure 2:
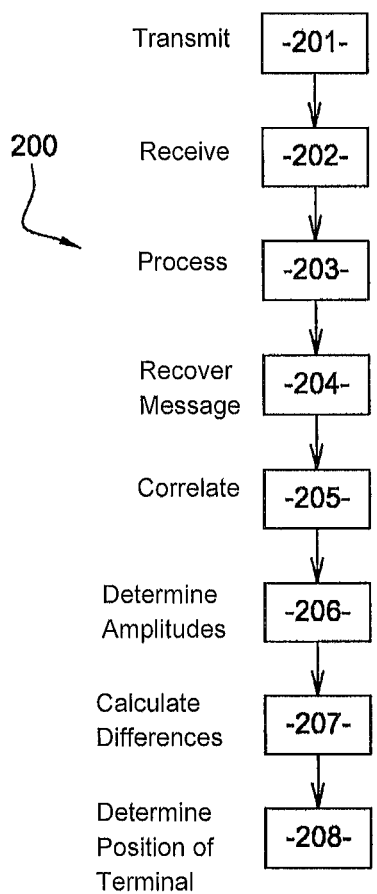
FIG. 2 illustrates the different steps of the method according to the invention.

FIG. 2 illustrates the different steps of a method 200 for locating a terminal in a telecommunication network according to the invention. Said method 200 may for example be implemented by means of a telecommunication network such as the network 100 represented in FIG. 1.

Said network 100 comprises:
at least one main terrestrial station 102 such as a terrestrial communication gateway;
a NOC or Network Operating Centre 105;
a plurality of mobile terminals, of which only one T is here represented by way of illustration;
a multi-beam satellite 103.

The multi-beam satellite 103 is here a satellite of "transparent" type (i.e. provided with a transparent payload), the payload of which consists essentially of a frequency translation of the signals received at the level of the satellite before amplification to retransmit them on a downlink. In other words, the method according to the invention applies to this type of transparent satellite and not to satellites of "regenerative" type (i.e. provided with a regenerative payload), the payload of which demodulates and re-modulates signals on board the satellite.

In the case of a high speed broadband satellite telecommunication system 10, the satellite 103 is used in a bidirectional manner, in other words both for:
relaying the data transmitted by the main terrestrial station 102 to the terminals T: this first point to multi-point type link constitutes the forward link;
relaying to the main terrestrial station 102 the data transmitted by the terrestrial terminals T: this second multi-point to point type link constitutes the return link.

The main terrestrial station 102 is connected to the NOC 105 (typically via the Internet). The NOC 105 is a network management system that enables the operator to monitor and control all the components of the network.

In return link, modulated signals are sent to the multi-beam satellite 103 on an LMR uplink by the terrestrial terminal T. The signals sent by the terrestrial terminals T are then processed at the level of the satellite 103 which, via its payload, amplifies them, derives them to an appropriate frequency then retransmits them from the satellite antenna(s) on a LDR downlink in the form of a beam or of a plurality of beams to the terrestrial station(s) 102.

The forward link including the LMA uplinks and LDA downlinks from the terrestrial station(s) 102 to the terrestrial terminals T operates in an identical manner with an opposite direction of communication. In the context of this invention the forward link is not used.

The satellite 103 covers a coverage area in which are located the terrestrial terminals T broken down into elementary coverage areas or cells. The configuration of the network 100 as represented in FIG. 1 uses a technique referred to as frequency reuse: this technique makes it possible to use a same frequency range several times in the same satellite system in order to increase the total capacity of the system without increasing the assigned pass band.

For each cell, it is possible to use at least one frequency band corresponding to part of the available pass band. Each frequency band is associated with a beam of the multi-beam satellite 103. Here, three cells A, B and C are represented, the terminal T as illustrated being located in cell A. Each of the cells is illuminated individually by a beam (that will also be designated respectively by the antenna references A, B and C) of the multi-beam antenna of the satellite 103.

In general, the antenna gain of each beam is high within the corresponding cell, and decreases outside the cell. Consequently, the terminal T will be better "heard" by the satellite 103 on the beam corresponding to cell A than on the beams corresponding to cells B and C (the satellite 103 is provided with a multi-beam antenna which listens to the different beams corresponding to the different cells). Each frequency band may be broken down into a plurality of frequency channels. A terrestrial terminal T is thus going to use a frequency channel to transmit; this same terminal T is also going to function in a particular time interval (time slot).

A cell covers a surface ranging from a hundred or so kilometers to several thousands of kilometers (i.e. an entire country). When it is affirmed that a beam covers (or corresponds) to a cell, this signifies that part of the gain of the multi-beam receiving antenna of the satellite is concentred on this cell such that the resulting figure of merit is greater than a given threshold value S. Generally expressed in dB/K, the figure of merit, noted G/T, corresponds to the quotient of the gain of the receiving antenna in the direction of the terminal over the equivalent noise temperature of the receiving system. S(T,A) will hereafter designate the figure of merit G/T associated with cell A (designating equally beam A) for the position of the terminal T; in a more general manner, S(Y,X) (expressed in dB/K) will hereafter designate the figure of merit G/T associated with cell X (beam X) for the position of terminal Y. This figure of merit includes the figure of merit of the receiving satellite antenna (which depends on the geographic position of the terminal), on the amplifier on board the satellite, on the reception antenna of the terrestrial station, on its amplifiers and cables up to the input of the demodulator. It will be noted that from among all the factors that contribute to the total G/T, only the G/T of the multi-beam antenna on board the satellite changes according to the geographic position of the terminal.

The methods of encoding and modulation for a telecommunication system are chosen such that the threshold value S guarantees a sufficient service quality level, said service quality level not being guaranteed if the terminal is located at a position where the figure of merit is below the threshold value S (the terminal is then considered as being outside of the coverage of the beam). In practice, it is clear that the figure of merit progressively decreases when one exits the cell. The coverage of a cell is represented by a series of lines (or figures) of successive and substantially concentric figures of merit, the figures of merit being identical at all points of each line and decreasing as one moves away from the centre of the cell. The exact geometry may be very complex and depends on the manner in which the antenna (reflectors, beam forming network, etc.) is formed.

Figure 3:
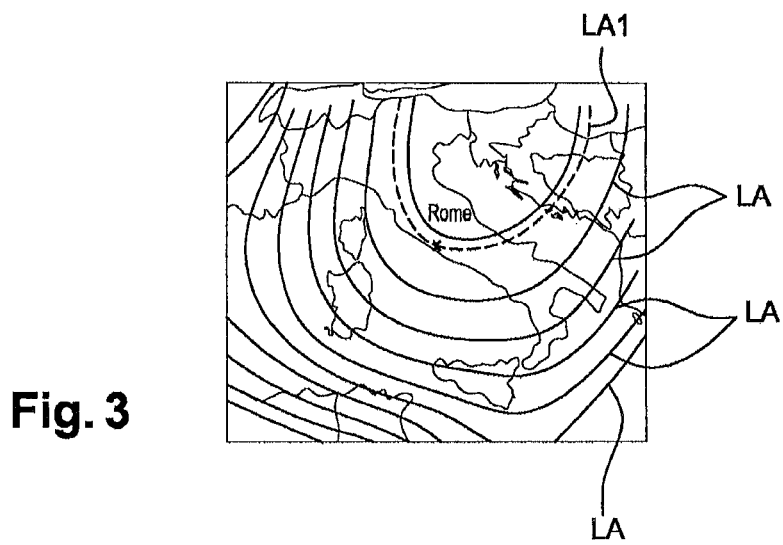
FIG. 3 illustrates a series of lines of figures of merit corresponding to a first beam of a coverage area.

FIG. 3 illustrates a series of lines LA of figures of merit corresponding to a first beam A in the coverage area of Europe.

Figure 4:
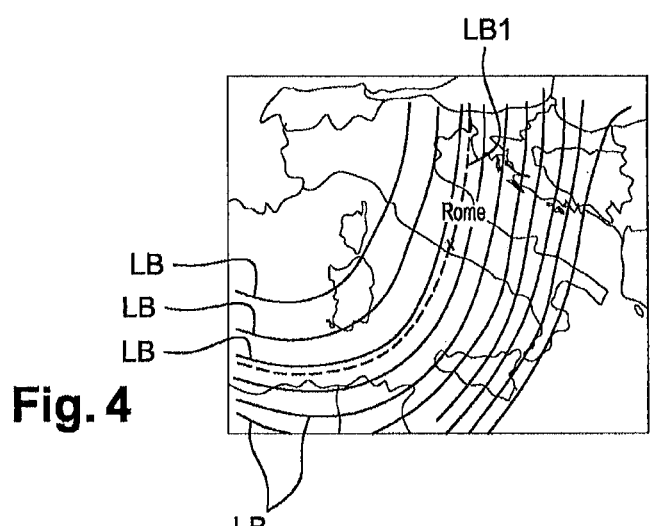
FIG. 4 illustrates a series of lines of figures of merit corresponding to a second beam of the same coverage area as FIG. 3.

FIG. 4 illustrates a series of lines LB of figures of merit corresponding to a second beam B in the coverage area of Europe.

Figure 5:
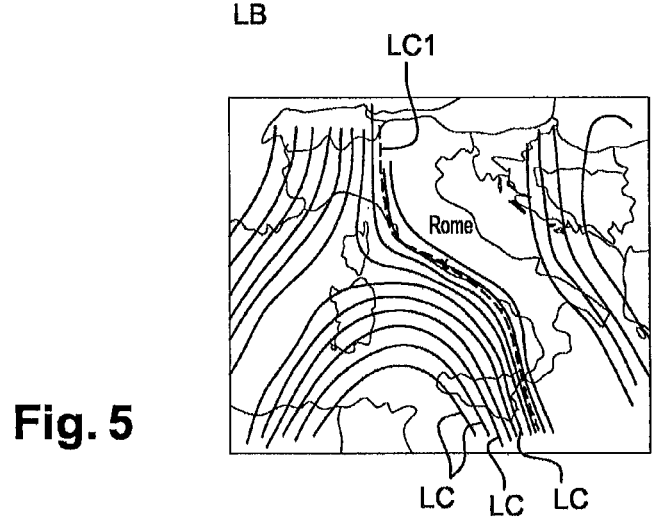
FIG. 5 illustrates a series of lines of figures of merit corresponding to a third beam of the same coverage area as FIG. 3.

FIG. 5 illustrates a series of lines LC of figures of merit corresponding to a third beam C in the coverage area of Europe.

In FIGS. 3 to 5, the passage from one line to another takes place according to a step of 1 dB/K, the line circumventing the area of smallest diameter having the highest figure of merit, it being understood that the reduction in the figure of merit from the centre of the cell to its exterior takes place in a continuous manner.

As an example, it will thus be noted in these FIGS. 3 to 5 that the city of Rome is covered by the three beams A, B and C with different figures of merit, respectively 8.7 dB/K for beam A (FIG. 3), 6.5 dB/K for beam B (FIG. 4) and −5 dB/K for beam C (FIG. 5). The lines LA1, LB1 and LC1 passing through Rome have been represented in dotted line for purely illustrative purposes.

It will thus be noted that knowledge of three lines LA1, LB1 and LC1 of figures of merit makes it possible to determine the position of a terminal transmitting from Rome and being located at the intersection of these three lines. This result is going to be advantageously used by the method according to the invention.

The hypothesis will be made hereafter that cells A, B and C represented in a schematic manner in FIG. 1 correspond to the figures of merit represented respectively in FIGS. 3, 4 and 5.

The method 200 for locating a terminal at the surface of a coverage area (here Europe) by means of a telecommunication network 100 such as that of FIG. 1 functions in the following manner.

The hypothesis will be made here that the three cells A, B and C (corresponding to the beams A, B and C) are associated with a same frequency band and that the terrestrial terminal T is located in cell A. The terminal T is for example located in Rome.

The main terrestrial station here comprises three demodulators/decorrelators 116A, 116B and 116C adapted to demodulate respectively the signals coming from cells A, B and C.

The modulations function for example according to a multiple random access asynchronous protocol with band spreading by modulation of the SPREAD ALOHA type using interference elimination techniques. Such a protocol is for example described in the document US2010/0054131 (del Rio Herrero et al.).

In the case illustrated in FIG. 1, the terminal T situated in cell A will be "heard" at a certain power by the demodulator 116A, at a lower power by the demodulator 116B and at an even lower power for the demodulator 116C. For the record, the city of Rome is covered by the three beams A, B and C with decreasing figures of merit (FIGS. 3 to 5).

It will moreover be noted that a single terrestrial station 102 comprising three demodulators has been represented here, but that it is also possible to have three terrestrial stations located at different places.

According to a first step 201 of the method 200 according to the invention, the terminal T transmits in LMR uplink a message incorporated into a modulated SM signal to the satellite 103 at a frequency belonging to the frequency bands shared by the three beams A, B and C.

The method according to the invention preferentially uses an encoding and modulation chosen in order to obtain a very low threshold value S (as defined above). This is equivalent to widening the cells compared to a conventional telecommunication system, so that the SM signal emitted can be recovered on three different cells.

According to a step 202, said SM signal incorporating the message transmitted by the terminal is received by the multi-beam antenna of the satellite 103; the message included in the SM signal is received with three different amplitudes depending on whether it is received by the parts of the antenna corresponding respectively to beams A, B and C; the antenna comprises one or more reflectors as well as a beam forming network intended for the inputs of the repeater of the satellite. As already evoked above, the amplitude of the message incorporated into the signal received on beam A will be the highest, the amplitude of the message incorporated into the signal received on beam B being weaker, and the amplitude of the message incorporated into the signal received on beam C being the weakest of the three. It may thus be considered that from a single signal incorporating a message sent by terminal T, there are, at the level of the satellite, three signals incorporating this same message but with different amplitudes.

According to step 203, the signals including the copy of the message with three different amplitudes are then processed at the level of the satellite 103 which, via its payload, derives them and modulates them to an appropriate frequency (here three different frequencies for each of the signals), amplifies them, then transmits in LDR downlink these three signals S1, S2 and S3 modulated to different frequencies and incorporating said message from the satellite antenna(s) to the terrestrial station 102; the three signals S1 to S3 each contain a replica of the single message sent by the terminal T and received by the satellite along the three beams A, B and C. The three signals S1 to S3 can also contain signals coming from other terminals as well as interference and noise.

According to step 204, it will be easily understood that the demodulator 116A (beam A) will receive the signal from the terminal T with more power than the demodulators 116B (beam B) and 116C (beam C).

In so far as the link budget corresponding to the transmission of the signal along beam A is good, the demodulator 116A is capable of processing this signal and recovering the information corresponding to the message transmitted by the terminal. This information contains the payload of the message but also the identifier of the terminal, the phase of the signal, the temporal position (i.e. sample number relative to the clock of the terrestrial station 102) of the message in the signal received; the demodulator 116A, in searching for the message, is also going to determine the binary spread spectrum sequence. The binary information contained in the radioelectric signal are for example extracted by two operations often carried out in an intermingled manner, a first operation of frequency transposition using a carrier generated locally by a PLL (Phase Lock Loop) oscillator type circuit making it possible to transpose the signal into base band and a second operation consisting for example in sampling the signal, to carry out a step of despreading using pseudo-random binary sequences generated locally by a binary sequences generator and to demodulate the despread signal; the demodulator thus generates several binary sequences then carries out a correlation operation. To recover the information of the message, the demodulator has to generate the same spreading sequence as that used in emission and multiply it by the signal received, the data encoded by this sequence thus being restored by a correlation operation (despreading).

According to step 205, being provided with complete knowledge of the message sent by the terminal T as well as the transmission parameters (i.e. the binary spread spectrum sequence), the demodulators 106B and 106C are each capable of finding the message transmitted by the terminal T in the respective signals S2 and S3 received. To do this, each of the demodulators 106B and 106, apart from a frequency transposition and a sampling, carries out a correlation operation simplified by knowledge of the payload of the message, the preamble of the message and the binary spread spectrum sequence. The fact of knowing the message considerably facilitates the search for the message in the signal by the demodulators 106B and 106C that receive the signal with a much lower signal to noise ratio than that of the demodulator 106A. It will moreover be noted that the demodulator 106A can also communicate information relative to the number of the sample so as to enable the demodulators 106B and 106C to save time during the correlation operation (i.e. having available a time window in which is located the message and where the demodulators 106B and 106C can go to search directly). Another way of improving the signal to noise ratio may consist in using an interference cancellation method for the signals coming from each of the cells A, B and C (intra-cellular interference cancellation). To do this, for each cell, the terrestrial station 102 re-constructs a "clean" signal (i.e. non-noisy signal from data recovered from the message then subtracts said "clean" signal from the signal received. The new signal obtained undergoes in turn a demodulation by the demodulator corresponding to the cell (116A, 116B or 116C). This operation may be repeated for other packets. Its operating principle consists in regenerating the interference using the signal estimated at the output of the current stage. This interference is then subtracted from the signal received and the resulting signal constitutes the input of the next stage. The operation may be performed by grouping together several packets (for example ten packets are demodulated before regenerating the signal to subtract).

Thus, after step 205, the terrestrial station 102 has been provided with complete knowledge of the message sent by the terminal T and its position within the signals received from three beams A, B and C.

According to step 206, the terrestrial station 102 is going to determine from the complete knowledge of the message sent and its position within the signals received the amplitude P(T, A), P(T, B) and P(T, C) at which it has received said message within the signals S1 to S3 corresponding respectively to the beams A, B and C. Each of the amplitudes P(T,A), P(T,B) and P(T,C) corresponds respectively to the powers at which the message transmitted by the terminal T along the respective beams A, B and C has been received by the terrestrial station 102. Different methods for determining amplitudes are for example described in the following documents: "Analysis of a DS/CDMA successive interference cancellation scheme using correlations" (P. Patel, J. Holtzman, IEEE Global Telecommunications Conference 1993, GLOBECOM '93, Houston Tex. USA, 29 Nov.-2 Dec. 1993, pp. 76-80 vol. 1), "Analysis of a simple successive interference cancellation scheme in a DS/CDMA system IEEE Journal on Selected Areas in Communications" (P. Patel, J. Holtzman, June 1994, Volume 12, Issue 5, pp. 796-807), "Practical Implementation of Successive Interference Cancellation in DS/CDMA Systems" (K. Pedersen, T. Kolding, I. Seskar, J. Holtzman, Proceedings ICUPC '96, Cambridge, Mass., pp. 321-325). It will be noted that the different calculation steps described may be carried out by calculation means included in the terrestrial station 102 or in the network operation centre NOC 105.

It will also be noted that the calculations are not necessarily all carried out in real time; typically, the correlation operations can be carried out after the data necessary for these operations has been stored, depending on the nature of the service requested.

On the basis of the hypothesis that a same terrestrial station 102 receives all of the three signals (and thus that one has a same link budget), it can be shown that P(T,A) is proportional to the EIRP (equivalent isotropically radiated power) of transmission of the terminal T and to the figure of merit S(T,A) of beams A at the position of the terminal; the same reasoning applies for P(T,B) and P(T,C). Since the EIRP is the same in all cases, being a single signal transmitted by the terminal, one then has the three following relations independent of the EIRP transmission of the terminal:

$$P(T,A)-P(T,B)=S(T,A)-S(T,B).$$

$$P(T,B)-P(T,C)=S(T,B)-S(T,C).$$

$$P(T,A)-P(T,C)=S(T,A)-S(T,C).$$

For the record, S(Y,X) (expressed in dB/K) represents the figure of merit G/T associated with cell X for the location of terminal Y.

According to step 207 of the method, the calculations of three differences P(T,A)−P(T,B), P(T,B)−P(T,C) and P(T,A)−P(T,C) are performed.

It will be noted that if the EIRP of the terminal was known, it would be possible to directly calculate the figure of merit from the amplitude received for each beam. Knowledge of these figures of merit would make it possible, by placing oneself on the corresponding figure of merit line (cf. FIGS. 3 to 4) to determine the location of the terminal T using only two beams. Nevertheless, the EIRP of the terminal is rarely known with precision: it can vary depending on the type of antenna used by the terminal, depending on the environment; in addition, the user could try to make it vary to change its apparent position. Consequently, the method according to the invention preferentially uses the difference in amplitudes determined according to step 206 to dispense with the knowledge of the EIRP by calculating the difference in the figures of merit associated respectively with two cells for the same terminal T.

The values below are data given purely for illustrative purposes. Let us assume that the following amplitudes calculated by the demodulators correspond to a certain EIRP used by the terminal T:

$$P(T,A)=-145.4 \text{ dBW}$$

$$P(T,B)=-147.6 \text{ dBW}$$

$$P(T,C)=-159.1 \text{ dBW}.$$

The following values are deduced therefrom, which are independent of the EIRP of the terminal:

$$P(T,A)-P(T,B)=S(T,A)-S(T,B)=2.2 \text{ dB}$$

$$P(T,B)-P(T,C)=S(T,B)-S(T,C)=11.5 \text{ dB}$$

$$P(T,A)-P(T,C)=S(T,A)-S(T,C)=13.7 \text{ dB}$$

For the record, the cartography of the lines of figures of merit as represented in FIGS. 3 to 5 is moreover known (i.e. a line of figure of merit corresponds to a line of the coverage area for a given beam on which the figure of merit has the same value).

Figure 6:
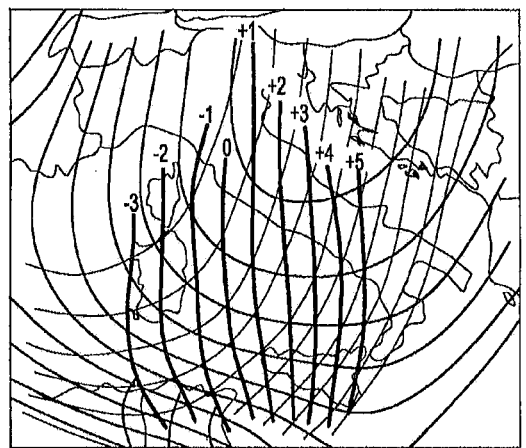
FIG. 6 illustrates a series of lines representing the difference in figures of merit of FIGS. 3 and 4.
Figure 7:
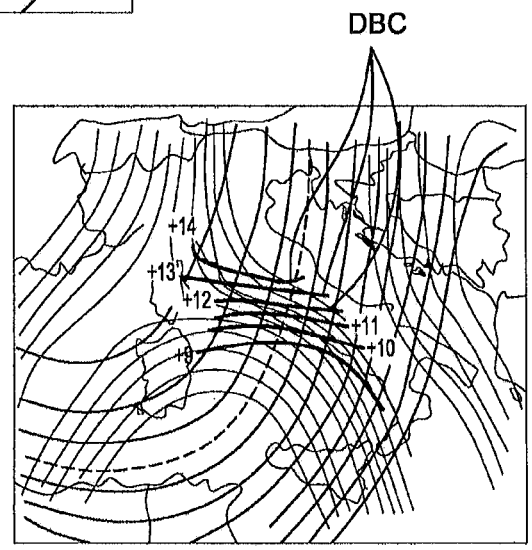
FIG. 7 illustrates a series of lines representing the difference in figures of merit of FIGS. 4 and 5.
Figure 8:
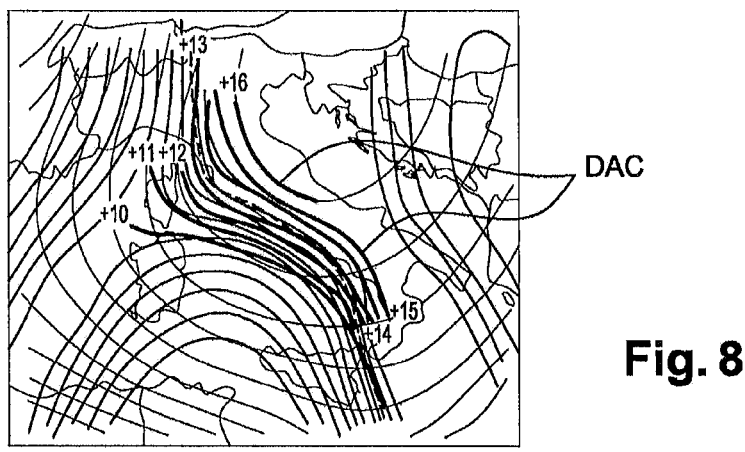
FIG. 8 illustrates a series of lines representing the difference in figures of merit of FIGS. 3 and 5.

From these lines, it is thus possible to plot lines representing the difference between the figure of merit corresponding to a first beam and the figure corresponding to a second beam. By way of illustration, FIG. 6 illustrates several DAB lines representing the difference in the figures of merit between FIG. 3 and FIG. 4. FIG. 7 illustrates several DBC lines representing the difference in the figures of merit between FIG. 4 and FIG. 5. FIG. 8 illustrates several DAC lines representing the difference in the figures of merit between FIG. 3 and FIG. 5.

According to step 208 of the method, knowing the values of the differences between the figures of merit associated with beams A, B and C for the location of terminal T, it is possible to determine the lines of differences in figures of merit corresponding to the three values P(T,A)−P(T,B)=2.2 dB, P(T,B)−20 P(T,C)=11.5 dB and P(T,A)−P(T,C)=13.7 dB.

Figure 9:
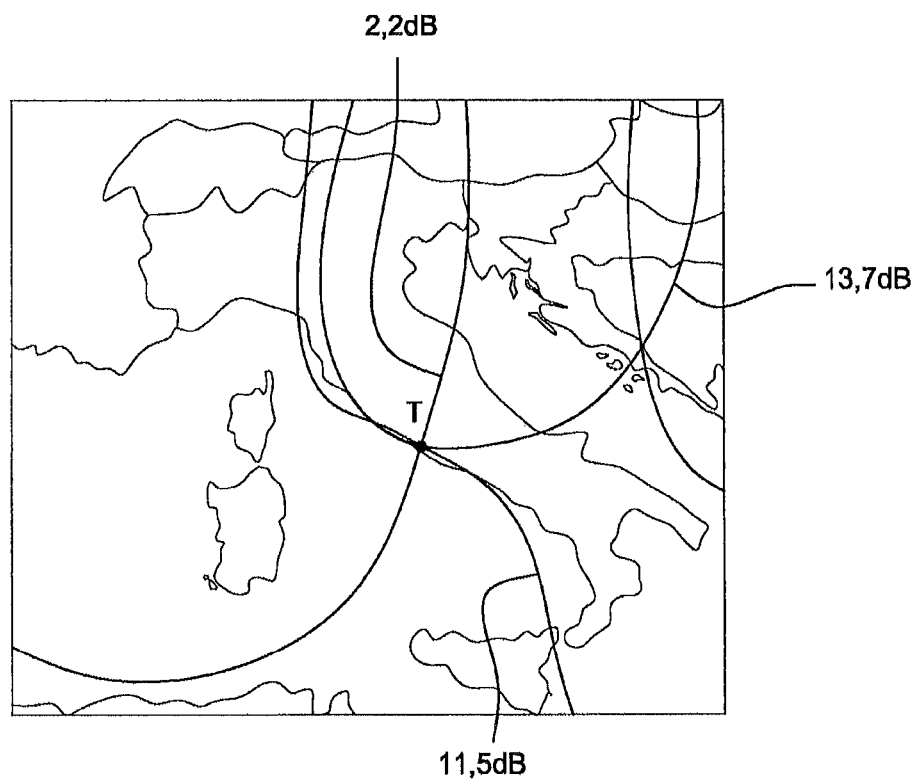
FIG. 9 represents the coverage area as well as the lines of differences in figures of merit calculated from mappings of figures of merit for the three values of amplitude differences determined by the method according to the invention in the specific example described hereafter.

FIG. 9 represents the coverage area as well as the lines of differences in figures of merit calculated from mappings of figures of merit for the three values of amplitude differences 2.2 dB, 11.5 dB and 13.7 dB.

According to step 209, one deduces therefrom the position of terminal T as being located at the intersection of these three lines of differences in figures of merit. It will be noted that two lines of differences suffice to determine the position, the third serving to refine the result. On the other hand, the method according to the invention requires the determination of at least three amplitudes to achieve the determination of these differences.

It will moreover be noted that the hypothesis has been made that a same terrestrial station 102 receives all of the three signals (and thus that one has a same link budget), such that the following three relations are verified:

$$P(T,A)-P(T,B)=S(T,A)-S(T,B).$$

$$P(T,B)-P(T,C)=S(T,B)-S(T,C).$$

$$P(T,A)-P(T,C)=S(T,A)-S(T,C).$$

As mentioned above, the method according to the invention also applies in the case where several terrestrial stations are used such that the three signals transmitted by the satellite are not received by the same terrestrial station.

In this case, we will assume the existence of a reference terminal R perfectly localised in the coverage area and different to terminal T as it is known with good precision:
- the figures of merit S(R,A), S(R,B) and S(R,C) associated with the position of the terrestrial terminal R with respect to cells A, B and C;
- the powers P(R,A), P(R,B) and P(R,C) at which the message transmitted by the terminal R is received by the different terrestrial stations 102A.

The normalised power ratio of terminal T and the reference terminal R is the same, independently of cell A or B; the normalised power is given by the ratio between the power received and the figure of merit; when the power received and the figure of merit are expressed in dB, this ratio is expressed by the difference: P(Y,X)−S(Y,X); consequently, one then has the relation:

$$P(T,A)-S(T,A)-(P(R,A)-S(R,A))=P(T,B)-S(T,B)-(P(R,B)-S(R,B)).$$

One deduces therefrom the difference S(T,A)−S(T,B) estimated by the relation:

$$S(T,A)-S(T,B)=P(T,A)-P(T,B)+P(R,A)-S(R,A)-P(R,B)+S(R,B)$$

The differences S(T,B)−S(T,C) and S(T,A)−S(T,C) are calculated in a similar manner. Once the differences obtained, the remainder of the method according to the invention is identical.

The hypothesis is made that the terrestrial station knows with sufficient detail the coverage mappings for the different beams (i.e. knows the figure of merit G/T for all the points within the service area). These mappings are generally constructed during a test phase referred to as IOT (in-orbit test) of a satellite. The G/T values for a position can then vary for different reasons (movements of the satellite, thermal effects on the reflectors or other components of the satellite). This is likely to result in a loss of precision in the location obtained by the method of the invention. To reduce the error obtained, it is possible to use one or more reference terminals that may be deployed: these reference terminals, which are controlled by the service operator, are thus "reliable" and calculate their exact position by means (e.g. GPS, EGNOS) other than the method according to the invention; the reference terminals periodically send "pilot" messages. The terrestrial station knows for each message received the exact position of the reference terminal that has sent it (for example: the position is fixed and already known; it is communicated by any communication network; it is contained in the pilot message). Thanks to the measurement of the pilot messages, the terrestrial station can dynamically correct the coverage mappings in the areas corresponding to the positions of the reference terminals and, by interpolation, in the remainder of the coverage area, so as to reduce the location error of the method.

The method according to the invention makes it possible, independently of the terminal and its capacities (including for a terminal not having high-performance calculation means) to determine with good precision the location of the terminal at the surface of the coverage area (in this respect, it will be noted that the method does not make it possible to determine the height at which the terminal is located). The determination of the position is made at the level of the NOC or the terrestrial station(s), and it cannot be altered by a faulty behaviour of the terminal. The method finds a particularly interesting application in the case of the plotting of certain mobile terminals (typically in the case of the transport of hazardous materials or animals and rescue operations) but also in the case of the geolocation of fixed terminals (typically decoders, the use of which is limited to a given territory and for which it is wished to verify the presence in said territory). Preferentially coupled with a standard geolocation system (e.g. GPS), which can have better precision, the method according to the invention makes it possible to certify that the position determined by the terminal is genuine (within a certain error interval).

Obviously, the invention is not limited to the embodiment that has been described.

The invention can thus apply to different types of telecommunication networks using a multi-beam satellite such as a satellite functioning in S, K or X frequency band.

The invention claimed is:

1. Method for locating a terminal at the surface of a coverage area by means of a telecommunication network for establishing radiofrequency links, the network comprising a telecommunication multi-beam satellite having a plurality of beams, said multi-beam satellite comprising a multi-beam antenna, said coverage area comprising a plurality of cells, each cell being associated with at least one beam for linking to the satellite to which a frequency band is assigned, said method comprising:
performing an uplink transmission by the terminal of a message incorporated into a modulated signal to said multi-beam satellite at a frequency shared by at least three different uplink beams such that said message is received by said multi-beam satellite via said multi-beam antenna with three different amplitudes;
performing a downlink transmission by the multi-beam satellite of three modulated signals incorporating said message, the first, second and third signals each corresponding to a different beam from among said three beams;
receiving said first, second and third signals by a terrestrial receiver;
determining the amplitudes of the message sent by the terminal incorporated into said first, second and third signals using a terrestrial calculation unit; and
determining the location of said terminal from said amplitudes of said message incorporated into said first, second and third signals;
wherein said message incorporated into said first signal is received by said terrestrial receiver with a greater amplitude than those of said message incorporated into the second and third signals, said method further comprising:
demodulation by said terrestrial calculation unit of said first signal so as to recover the information relative to the following message:
the payload of the message; and
the emission and/or encoding parameters of said message; and
using said information relative to the message to search for said message respectively in said second and third signals by said terrestrial calculation unit.

2. Method according to claim 1, wherein said modulated signal incorporating said message transmitted by said terminal is modulated according to a spread spectrum protocol.

3. Method according to claim 1, wherein said signal incorporating said message transmitted by said terminal is modulated according to a spread spectrum protocol and said recovered emission and/or encoding parameters comprise the binary spread spectrum sequence.

4. Method according claim 1, wherein said terrestrial calculation unit finds said message respectively in said second and third signals by a correlation operation.

5. Method according to claim 1, wherein the downlink transmission by said multi-beam satellite of said three modulated signals incorporating said message takes place at three different frequencies.

6. Method according to claim 1, comprising determining at least two of three amplitude differences of said message incorporated into said first, second and third signals.

7. Method according to claim 6, comprising: determining curves representing a difference in figures of merit corresponding to said amplitude differences; determining the location of said terminal corresponding to the intersection of said curves.

8. Method according to claim 6, wherein the three amplitude differences of said message incorporated into said first, second and third signals are determined.

9. Method for locating a terminal at the surface of a coverage area by means of a telecommunication network for establishing radiofrequency links, the network comprising a telecommunication multi-beam satellite having a plurality of beams, said multi-beam satellite comprising a multi-beam antenna, said coverage area comprising a plurality of cells, each cell being associated with at least one beam for linking to the satellite to which a frequency band is assigned, said method comprising:
performing an uplink transmission by the terminal of a message incorporated into a modulated signal td said multi-beam satellite at a frequency shared by at least three different uplink beams such that said message is received by said multi-beam satellite via said multi-beam antenna with three different amplitudes;

performing a downlink transmission by the multi-beam satellite of three modulated signals incorporating said message, the first, second and third signals each corresponding to a different beam from among said three beams;

receiving said first, second and third signals by a terrestrial receiver;

determining the amplitudes of the message sent by the terminal incorporated into said first, second and third signals using a terrestrial calculation unit;

determining the location of said terminal from said amplitudes of said message incorporated into said first, second and third signals;

determining at least two of three amplitude differences of said message incorporated into said first, second and third signals;

determining curves representing a difference in figures of merit corresponding to said amplitude difference; and determining the location of said terminal corresponding to the intersection of said curves;

wherein said terrestrial receiver periodically receives by one or several reference terminals, the exact position of which is known, said position making it possible to correct the lines of figures of merit used for the determination of the position of said terminal.

* * * * *